(12) United States Patent
Cardamone et al.

(10) Patent No.: US 10,298,108 B2
(45) Date of Patent: May 21, 2019

(54) LAMINATED LINEAR MOTOR STATOR CORE

(71) Applicant: Moog Inc., East Aurora, NY (US)

(72) Inventors: David P. Cardamone, Lansdale, PA (US); Carl R. Deirmengian, Media, PA (US); Brian J. Williams, Norwood, PA (US)

(73) Assignee: Moog Inc., East Aurora, NY (US)

( * ) Notice: Subject to any disclaimer, the term of this patent is extended or adjusted under 35 U.S.C. 154(b) by 723 days.

(21) Appl. No.: 14/775,598

(22) PCT Filed: Mar. 13, 2013

(86) PCT No.: PCT/US2013/030822
§ 371 (c)(1),
(2) Date: Sep. 11, 2015

(87) PCT Pub. No.: WO2014/142827
PCT Pub. Date: Sep. 18, 2014

(65) Prior Publication Data
US 2016/0036309 A1 Feb. 4, 2016

(51) Int. Cl.
*H02K 41/03* (2006.01)
*H02K 33/12* (2006.01)
(Continued)

(52) U.S. Cl.
CPC .......... *H02K 41/031* (2013.01); *H02K 1/145* (2013.01); *H02K 15/022* (2013.01); *H02K 33/12* (2013.01);
(Continued)

(58) Field of Classification Search
CPC ...... H02K 41/02; H02K 41/03; H02K 41/031; H02K 1/145; H02K 1/12; H02K 1/14;
(Continued)

(56) References Cited

U.S. PATENT DOCUMENTS

| | | | | |
|---|---|---|---|---|
| 4,335,338 A | * | 6/1982 | Sawyer | .................. H02K 41/03 310/12.18 |
| 4,810,914 A | * | 3/1989 | Karidis | ................ H02K 41/031 310/12.17 |

(Continued)

OTHER PUBLICATIONS

Yanliang et al., Development of Tubular Linear Permanent Magnet Synchronous Motor Used in Oil-well Field, Telkomnika, Dec. 2011, pp. 515-522, vol. 9, No. 3, Indonesia.

(Continued)

*Primary Examiner* — Edgardo San Martin
(74) *Attorney, Agent, or Firm* — Harter Secrest & Emery LLP

(57) ABSTRACT

A linear motor (15) comprising a stator (16) having an opening (18), a mover (19) disposed in the opening and configured and arranged to reciprocate linearly in an axial direction (x-x) relative to the stator, the stator comprising a first pole section (21) and a second pole section (22) stacked in the axial direction and forming a recess (26) between them for receiving annular windings, the first pole section comprising a first laminate (17a) having a first cross-sectional geometry (29) and a second laminate (17b) having a second cross-sectional geometry (30) different from the first cross-sectional geometry, and the first laminate and the second laminate stacked in the axial direction.

35 Claims, 9 Drawing Sheets

(51) Int. Cl.
*H02K 1/14* (2006.01)
*H02K 15/02* (2006.01)
*H02K 41/02* (2006.01)

(52) U.S. Cl.
CPC ..... *H02K 2201/06* (2013.01); *H02K 2201/15* (2013.01)

(58) Field of Classification Search
CPC .......... H02K 1/146; H02K 1/148; H02K 1/16; H02K 33/00; H02K 35/00; H02K 2201/06; H02K 2201/09
See application file for complete search history.

(56) References Cited

U.S. PATENT DOCUMENTS

| | | | | |
|---|---|---|---|---|
| 5,528,090 | A * | 6/1996 | Satomi | H02K 41/031 310/12.17 |
| 5,602,431 | A * | 2/1997 | Satomi | H02K 41/02 310/12.17 |
| 5,691,582 | A * | 11/1997 | Lucas | B21D 51/26 310/14 |
| 6,060,810 | A * | 5/2000 | Lee | H02K 1/12 310/14 |
| 6,289,575 | B1 * | 9/2001 | Hollingsworth | H02K 15/02 29/423 |
| 6,321,439 | B1 * | 11/2001 | Berrong | H02K 1/185 264/272.2 |
| 6,483,221 | B1 * | 11/2002 | Pawellek | H02K 1/148 310/216.064 |
| 6,603,224 | B1 * | 8/2003 | Hollingsworth | H02K 41/02 310/12.02 |
| 6,831,385 | B2 * | 12/2004 | Hasegawa | F16C 32/0461 310/216.004 |
| 6,877,214 | B2 * | 4/2005 | Neuenschwander | H01F 3/02 29/596 |
| 6,891,305 | B2 * | 5/2005 | Park | H02K 1/145 310/216.004 |
| 7,378,763 | B2 * | 5/2008 | Jack | H02K 1/145 310/12.06 |
| 7,830,057 | B2 * | 11/2010 | Gieras | H02K 1/145 310/152 |
| 7,884,508 | B2 * | 2/2011 | Jack | H02K 1/145 310/12.24 |
| 8,963,396 | B2 * | 2/2015 | Benner, Jr. | H02K 33/16 310/216.022 |
| 2006/0108878 | A1 | 5/2006 | Lindberg et al. | |
| 2006/0226718 | A1 * | 10/2006 | Yang | H02K 1/20 310/59 |
| 2007/0069591 | A1 * | 3/2007 | LeFlem | F03B 13/16 310/12.12 |
| 2013/0094982 | A1 * | 4/2013 | Sugimoto | H02K 1/14 417/423.7 |
| 2017/0063183 | A1 * | 3/2017 | Shrestha | H02K 1/22 |
| 2017/0179775 | A1 * | 6/2017 | Kim | H02K 1/02 |

OTHER PUBLICATIONS

The International Search Report (ISR) and Written Opinion of the International Searching Authority for International Application No. PCT/US2013/030822; Publication No. WO 2014/142827 A1; dated Sep. 13, 2015.

* cited by examiner

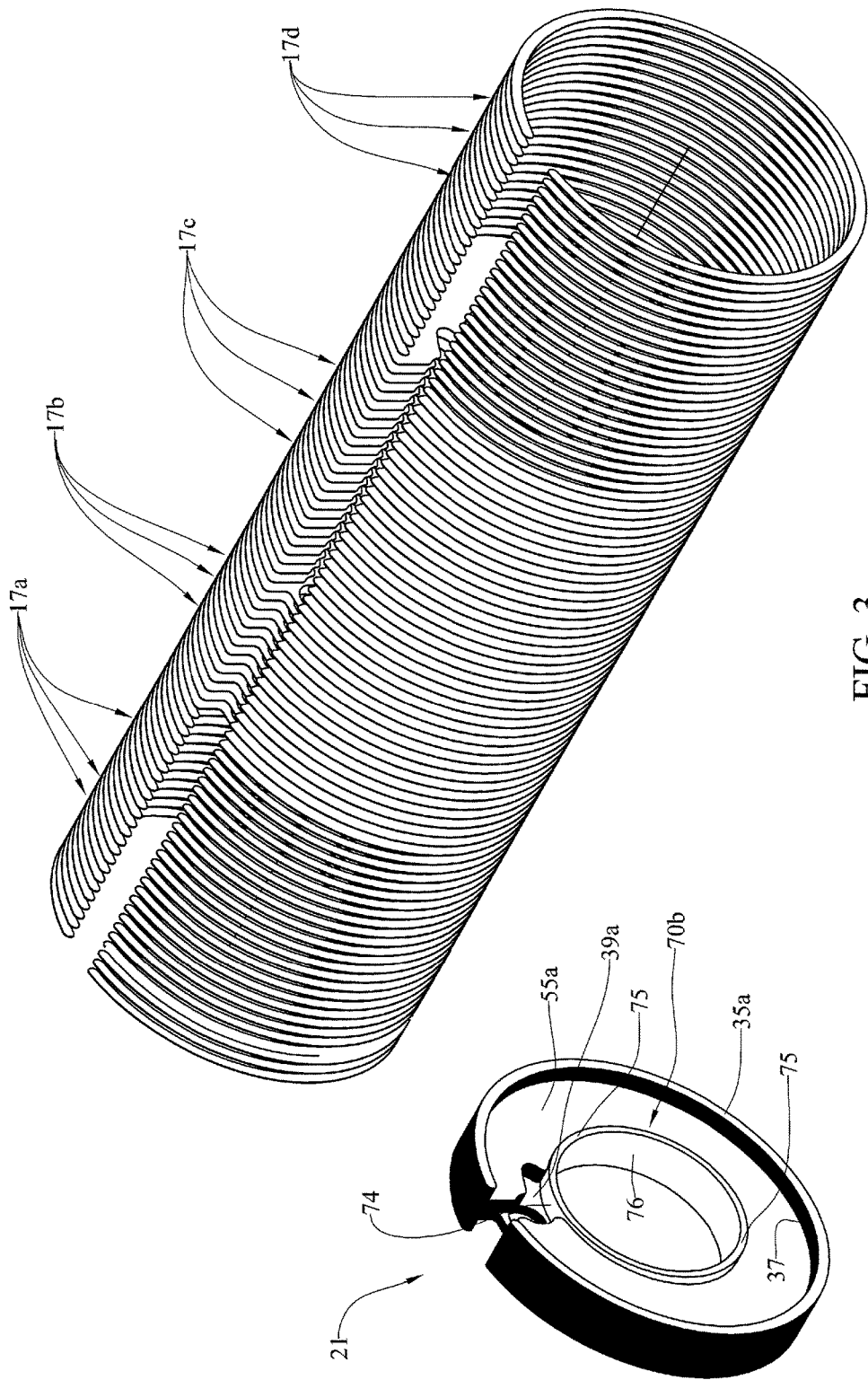

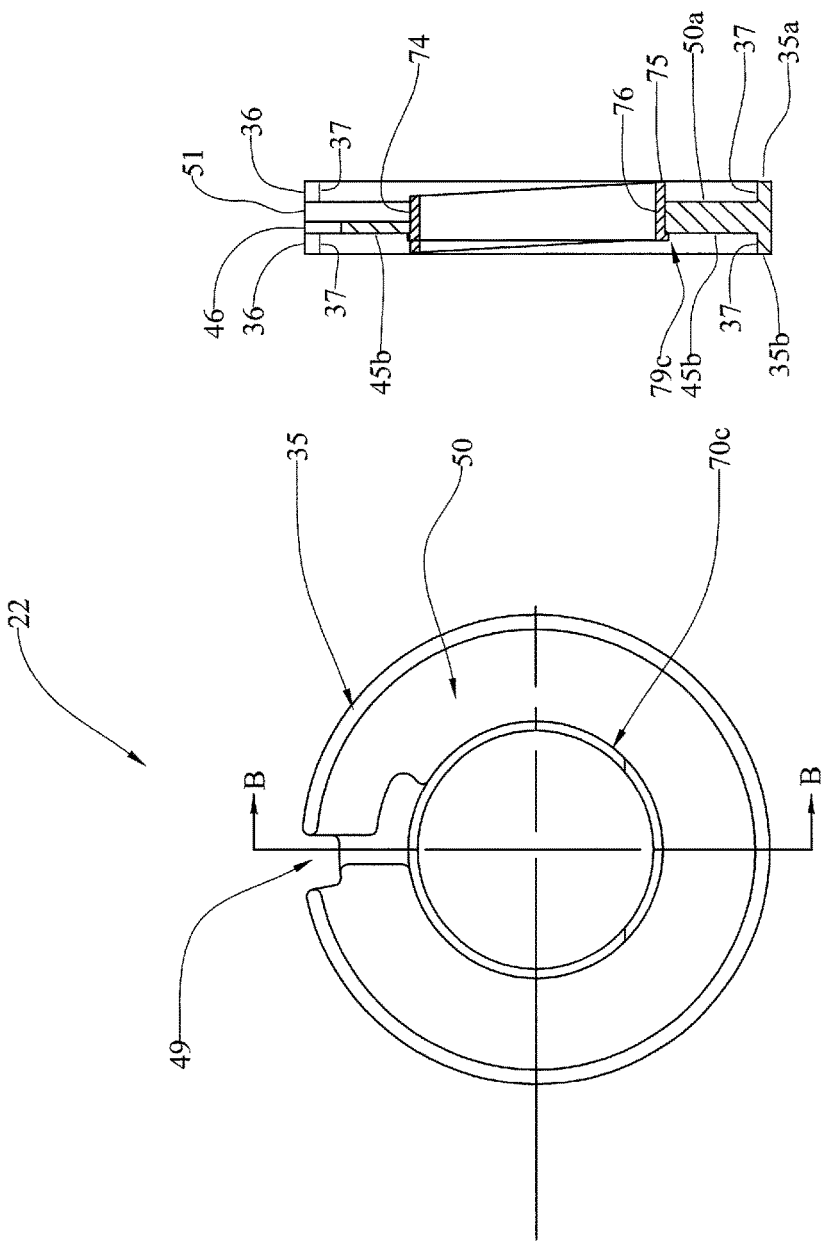

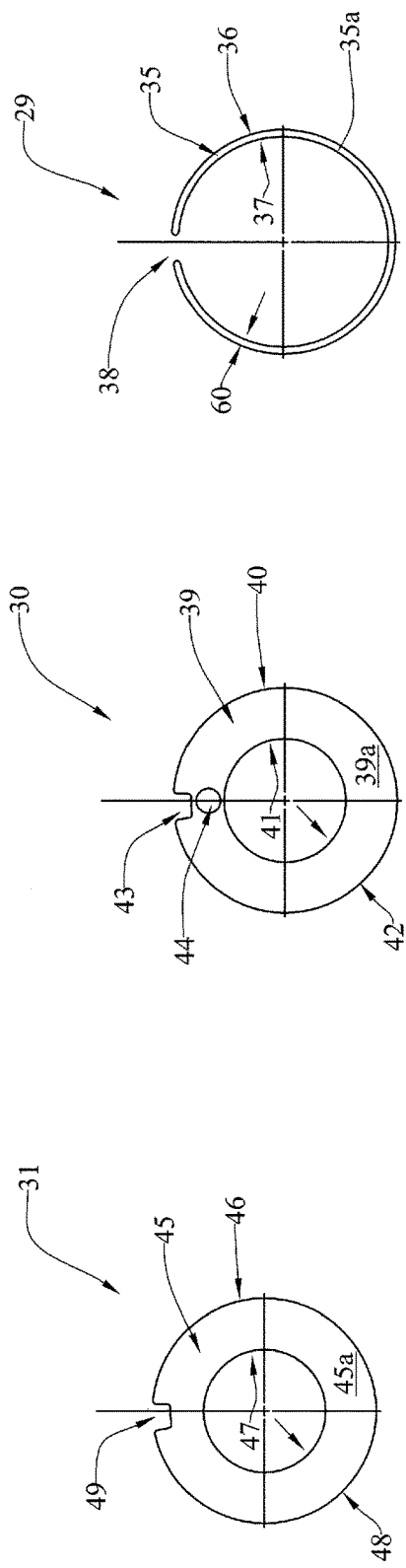
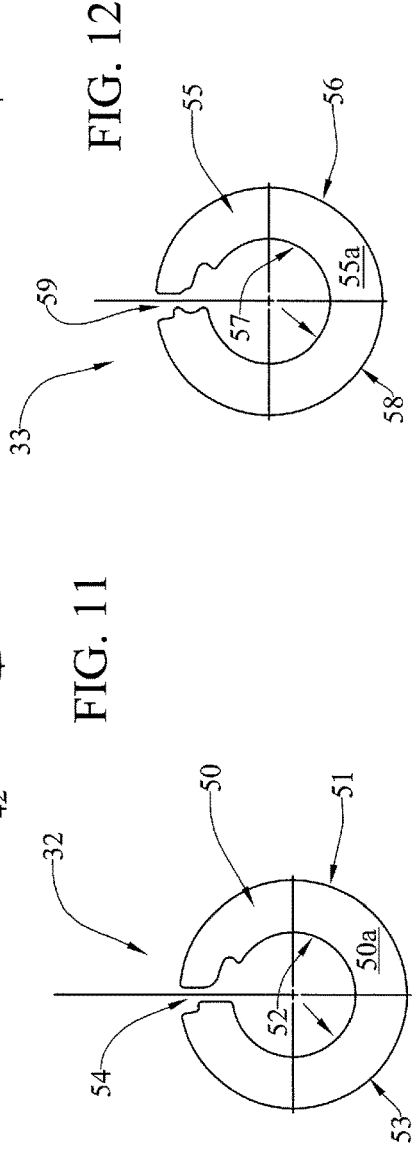
FIG. 12
FIG. 14
FIG. 11
FIG. 13
FIG. 10

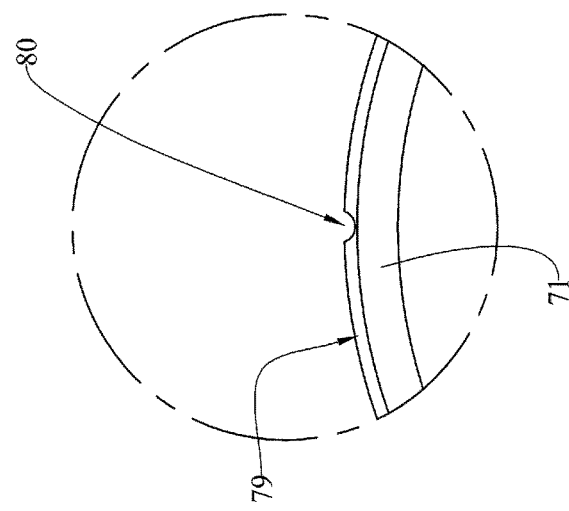
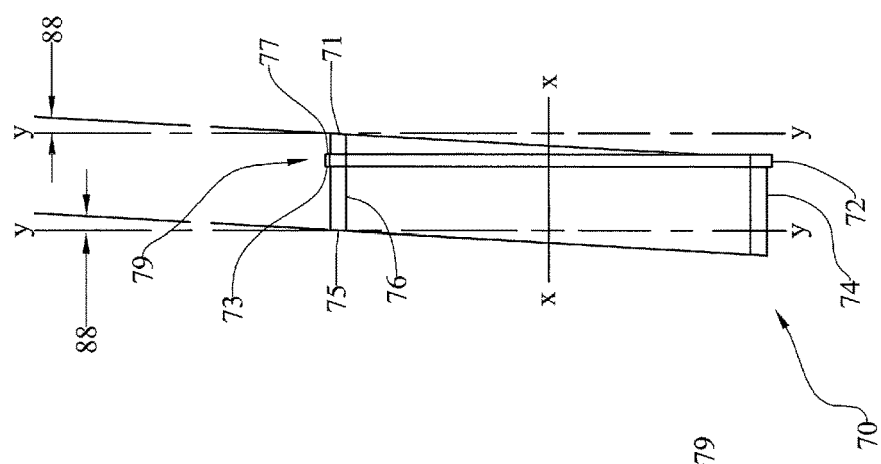
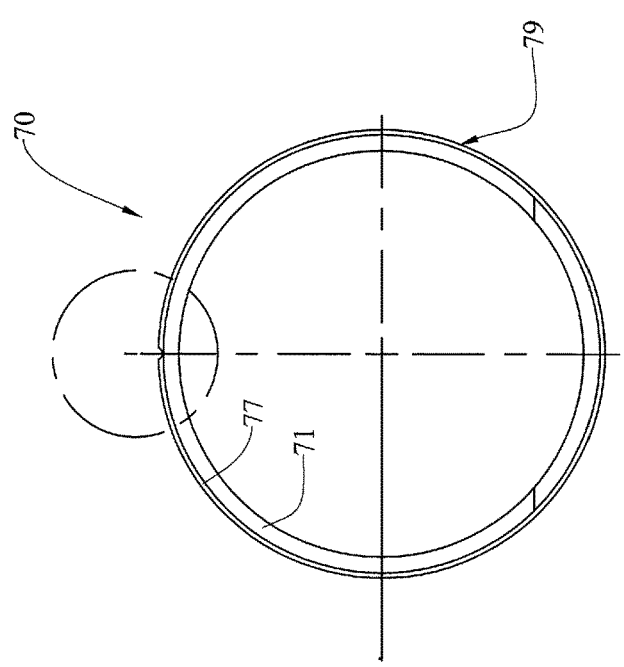
FIG. 17
FIG. 16
FIG. 15

LAMINATED LINEAR MOTOR STATOR CORE

TECHNICAL FIELD

The present invention relates generally to linear motors, and more particularly to a laminated stator and method of assembly for a linear motor.

BACKGROUND ART

Linear motors are known in the prior art. Conventional linear motors generally comprise a mover that reciprocates through the field of a stator due to magnetic forces generated by energized coils in the stator. Normally the stator is stationary and drives the mover in an axial direction. However, it is possible to make the mover stationary and have the stator drive itself in an axial direction. Accordingly, the axial direction is the linear direction of movement for either the mover or stator, depending on which of them is to move in relation to the other. The stator conventionally includes at least one coil wound in at least one stator core. The stator coil may be a single winding connected to an electrical supply unit or a distributive winding. The purpose of the stator coils is to generate magnetic flux that interacts with permanent magnets on the mover. Thus, a conventional linear motor includes a generally cylindrical outer stator core, stator coils wound within the stator core, and an inner mover having permanent magnets and that moves linearly in an axial direction relative to the stator core so as to provide linear motion by means of interaction with the magnetic field of the stator.

Various stator assembly configurations are known. For example, U.S. Pat. No. 6,603,224, entitled "Linear Motor Stator Assembly Piece," discloses a stator for a linear motor that is built by stacking module parts. U.S. Pat. No. 6,289,575, entitled "Method of Manufacturing a Stacked Stator Assembly for a Linear Motor," discloses a method of manufacturing a stator from individual pieces assembled around a removable form. U.S. Pat. No. 7,378,763, entitled "Linear Motor," discloses a stator core divided into two parts with each of the parts being made of a soft magnetic powder. U.S. Pat. No. 7,884,508, entitled "Linear Motor", also discloses a stator core divided into two parts formed of a soft magnetic powder and a mover that has at least one section also formed of a soft magnetic material. U.S. Pat. No. 6,060,810, entitled "Stator for Linear Motor by Staggered Core Lamination," discloses a stator for a linear motor formed from radially-extending laminates. Each of these U.S. patents is incorporated herein by reference.

BRIEF SUMMARY OF THE INVENTION

With parenthetical reference to corresponding parts, portions or surfaces of the disclosed embodiment, merely for the purposes of illustration and not by way of limitation, the present invention provides a linear motor (15) comprising a stator (16) having an opening (18), a mover (19) disposed in the opening and configured and arranged to reciprocate linearly in an axial direction (x-x) relative to the stator, the stator comprising a first pole section (21) and a second pole section (22) stacked in the axial direction and forming a recess (26) between them for receiving annular windings, the first pole section comprising a first laminate (17a) having a first, cross-sectional geometry (29) and a second laminate (17b) having a second cross-sectional geometry (30) different from the first cross-sectional geometry, and the first laminate and the second laminate stacked in the axial direction.

The first pole section may further comprise a third laminate (17c) having a third cross-sectional geometry (33) different from the first cross-sectional geometry and the second cross-sectional geometry and stacked in the axial direction with the first laminate and the second laminate. The first pole section may further comprise a fourth laminate (17d) having the first cross-sectional geometry (29) and stacked in the axial direction with the first, second and third laminates.

The first pole section may comprise multiple laminates having the first cross-sectional geometry and multiple laminates having the second cross-sectional geometry and stacked in the axial direction. The first cross-sectional geometry (29) of the first laminate may comprise an annular ring (35) having an outer perimeter (36) and an inner perimeter (37). The annular ring may comprise an opening (38) between the outer perimeter and the inner perimeter. The second cross-sectional geometry (30, 33) of the second laminate may comprise an annular ring (39, 55) having an outer perimeter (40, 56) and an inner perimeter (41, 57) and a radial thickness (42, 58) between them greater than a radial thickness (60) of the annular ring of the first cross-sectional geometry. The annular ring (55) of the second cross-sectional geometry (33) of the second laminate may comprise a shaped opening (59) between the outer perimeter (56) and the inner perimeter (57). The annular ring (39) of the second cross-sectional geometry (30) of the second laminate may comprise a first face (39a) and a second face and an opening (44) between the first face and the second face. The annular ring of the second cross-sectional geometry (30) of the second laminate may further comprise a notch (43) extending towards the inner perimeter (41) from the outer perimeter (40).

The linear motor may further comprise a center ring (70b) within the first pole section (21) and defining the opening of the stator. The center ring element may comprise an inner perimeter (76) configured to define at least in part the stator opening and an outer perimeter (74) configured to fit at least in part within the inner perimeter (41, 57) of the first pole section (21), a first facing surface (71) and a second facing surface (75), and the first facing surface skewed relative to an imaginary plane (y-y) oriented generally perpendicular to the axial direction (x-x) of the mover such that the first facing surface is not parallel to the plane oriented generally perpendicular to the axial direction of the mover. The second facing surface (75) may be skewed relative to the plane (y-y) perpendicular to the axial direction and may be parallel to the first facing surface (71). The first pole section (21) may comprise a first facing surface (39b) orientated in a plane (y-y) generally perpendicular to the axial direction (x-x) of the mover and the outer perimeter of the center ring element may comprise an axial alignment projection (79b) configured and arranged to extend radially outward at least in part beyond the inner perimeter (41, 57) of the first pole section (21) and to abut against the first facing surface (39b) of the first pole section (21). The axial alignment projection may comprise an annular contact surface (73) oriented in a plane (y-y) generally perpendicular to the axial direction of the mover. The center ring element may comprise a solid unitary steel tube.

The second pole section (22) may comprise a first laminate (17e) having a first cross-sectional geometry (29) and a second laminate (17f) having a second cross-sectional geometry (31) different from the first cross-sectional geometry, and the first laminate and the second laminate stacked in the axial direction. The second pole section may further comprise a third laminate (17g) having a third cross-sectional geometry (32) different from the first cross-sectional geometry and the second cross-sectional geometry and stacked in the axial direction with the first laminate and the second laminate. The second pole section may further comprise a fourth laminate (17h) having the first cross-sectional geometry (29) and stacked in the axial direction with the first, second and third laminates.

The second pole section may comprise multiple laminates having the first cross-sectional geometry and multiple laminates having the second cross-sectional geometry and stacked in the axial direction. The first cross-sectional geometry (29) of the first laminate may comprise an annular ring (35) having an outer perimeter (36) and an inner perimeter (37). The annular ring may comprise an opening (38) between the outer perimeter and the inner perimeter. The second cross-sectional geometry (31, 32) of the second laminate may comprise an annular ring (45, 50) having an outer perimeter (46, 51) and an inner perimeter (47, 52) and a radial thickness (48, 53) between them greater than a radial thickness (60) of the annular ring of the first cross-sectional geometry. The annular ring (50) of the second cross-sectional (32) of the second laminate may comprise a shaped opening (54) between the outer perimeter (51) and the inner perimeter (52). The annular ring of the second cross-sectional geometry (31) of the second laminate may comprise a notch (49) extending towards the inner perimeter (447) from the outer perimeter (46).

The linear motor may further comprise a center ring (70c) within the second pole section (22) and defining the opening of the stator. The center ring element may comprise an inner perimeter (76) configured to define at least in part the stator opening and an outer perimeter (74) configured to fit at least in part within the inner perimeter (47, 52) of the second pole section (21), a first facing surface (71) and a second facing surface (75), and the first facing surface skewed relative to an imaginary plane (y-y) oriented generally perpendicular to the axial direction (x-x) of the mover such that the first facing surface is not parallel to the plane oriented generally perpendicular to the axial direction of the mover. The second facing surface (75) may be skewed relative to the plane (y-y) perpendicular to the axial direction and may be parallel to the first facing surface (71). The second pole section (22) may comprise a first facing surface (45b) orientated in a plane (y-y) generally perpendicular to the axial direction (x-x) of the mover and the outer perimeter of the center ring element may comprise an axial alignment projection (79c) configured and arranged to extend radially outward at least in part beyond the inner perimeter (47, 52) of the first pole section and to abut against the first facing surface (45b) of the second pole section (22). The axial alignment projection may comprise an annular contact surface (73) oriented in a plane (y-y) generally perpendicular to the axial direction of the mover.

The first pole section (21) may comprise a first center ring element (70b) and the second pole section (22) may comprise a second center ring element (70c), wherein each of the first center ring element and the second center ring element comprise an inner perimeter (76) configured to define at least in part the stator opening and an outer perimeter (74) configured to fit at least in part within the inner perimeter of the respective pole section (41, 57 and 47, 52), a first facing surface (71) and a second facing surface (75), and the first and second facing surface skewed relative to an imaginary plane (y-y) orientated generally perpendicular to the axial direction (x-x) of the mover such that the first and second facing surface are not parallel to the plane oriented generally perpendicular to the axial direction of the mover, wherein the skew of the second facing surface of the first center ring element of the first pole section is substantially equal to the skew of the first facing surface of the second center ring element of the second pole section, and wherein the first center ring element and the second center ring element are stacked in the axial direction to form at least in part the opening of the stator. The skew may be configured and arranged to reduce cogging forces in the motor.

In another aspect, a linear motor is provided comprising a stator (16) having an opening (18), a mover (19) disposed in the opening and configured and arranged to reciprocate the linearly in an axial direction (x-x) relative to the stator, the stator comprising a first pole section (21) and a second pole section (22) stacked in the axial direction and forming a recess (26) between them for receiving annular windings, the first pole section having an outer perimeter (36, 40, 56) and an inner perimeter (41, 57), a center ring element (70b) having an inner perimeter (76) configured to define at least in part the stator opening and an outer perimeter (74) configured to fit at least in part within the inner perimeter of the first pole section, the center ring element further comprising a first facing surface (71) and a second facing surface (75), and the first facing surface skewed relative to an imaginary plane (y-y) orientated generally perpendicular to the axial direction (x-x) of the mover such that the first facing surface is not parallel to the plane orientated generally perpendicular to the axial direction of the mover.

The second facing surface may be skewed relative to the plane (y-y) perpendicular to the axial direction (x-x) and may be parallel to the first facing surface. The first pole section (21) may comprise a first facing surface (39b) orientated in a plane (y-y) generally perpendicular to the axial direction of the mover and the outer perimeter of the center ring element may comprise an axial alignment projection (79b) configured and arranged to extend radially outward at least in part beyond the inner perimeter (41, 57) of the first pole section and to butt against the first facing surface (39b) of the first pole section (21). The axial alignment projection may comprise an annular contact surface (73) orientated in a plane (y-y) generally perpendicular to the axial direction of the mover. The center ring element may comprise a solid unitary steel tube.

The first pole section and the second pole section may be provided with a rotational alignment contour (87) and the rotational alignment contour may comprise an axial notch.

The first stator pole section (21) may comprise a pole section rotational alignment contour (87) corresponding to a first rotational alignment key (82) of a ring rotational alignment fixture (81) and the center ring element (70) may comprise a ring rotational alignment contour (80) corresponding to a second rotational alignment key (83) of the ring rotational alignment fixture. The pole section rotational alignment contour may comprise an axial notch (38), the first rotational alignment key may comprise a tab (82) corresponding to the notch, the ring rotational alignment contour may comprise an axial notch (80), and the second rotational alignment key may comprise a protrusion (83) corresponding to the notch of the ring rotational alignment contour.

In another aspect, a method of forming a stator core of a linear motor is provided comprising the steps of forming a plurality of first laminates (17a) having a first cross-sectional geometry (29), forming a plurality of second laminates (17b, 17c, 17f, 17g) having a second cross-sectional geometry (30, 31, 32, 33) different from the first cross-sectional geometry, stacking the plurality of first laminates and the plurality of second laminates in an axial direction (x-x) to form at least in part a first stator pole (21) section having an inner perimeter (41, 57), stacking the plurality of the first laminates and the plurality of the second laminates in an axial direction to form at least in part a second stator pole section (22) having an inner perimeter (47, 52), forming a first skewed center ring element (17b), forming a second skewed center ring element (17c), pressing at least a portion (74) of the first skewed center ring element into the inner perimeter of the first stator pole section, pressing at least a portion of the second skewed center ring element (74) into the inner perimeter of the second stator pole section, and stacking the first pole section and the second pole section in the axial direction so as to form a recess (26) between them for receiving annular windings, and so that the first skewed center ring element and the second skewed center ring element form at least in part an opening (18) for receiving a mover (19) configured and arranged to reciprocate linearly in the axial direction (x-x) relative to the first and second stacked stator pole sections.

Each of the first skewed center ring element and the second skewed center ring element may comprise an inner perimeter (76) configured to define at least in part the stator opening and an outer perimeter (74) configured to fit at least in part within the inner perimeter of the respective pole section, a first facing surface (71) and a second facing surface (75), and the first and second facing surfaces skewed relative to an imaginary plane (y-y) orientated generally perpendicular to the axial direction of the mover such that the first and second facing surfaces are not parallel to the plane orientated generally perpendicular to the axial direction of the mover, and the steps of pressing at least a portion of the first skewed center ring element into the inner perimeter of the first stator pole section and pressing at least a portion of the second skewed center ring element into the inner perimeter of the second stator pole section may comprise rotationally aligning the first skewed center ring element and the second skewed center ring element such that the first facing surface and the second facing surface of the first skewed center ring element and the first facing surface and the second facing surface of the second skewed center ring element are all substantially parallel.

The plurality of first laminates and the plurality of second laminates may be provided with a rotational alignment contour (38, 43, 49, 54, 59) and the step of stacking the plurality of the first laminates and the plurality of the second laminates in an axial direction may comprise the steps of providing a stator laminate assembly fixture (100, 103), rotationally aligning the stator laminate assembly fixture with the rotational alignment contours of the laminates, and stacking the laminates with the stator laminate assembly fixture such that the stator laminate assembly fixture corresponds with the alignment contour of each of the laminates so as to provide a desired rotational alignment of the laminates relative to each other. The rotational alignment contour may comprise an axial notch (38, 43, 49, 54, 59) having a first edge (85a) and a second edge (85b) spaced apart from the first edge, and the stator laminate assembly fixture may comprise a first axial rod (86a) and a second axial rod (86b) spaced apart from the first rod.

The first stator pole section may be provided with a pole section alignment contour (87), the first skewed center ring element and the second skewed center ring element may be each provided with a ring alignment contour (80), and the step of pressing at least a portion of the first skewed center ring element into the inner perimeter of the first stator pole section may comprise the steps of providing a ring alignment fixture (81) having a first rotational alignment key (82) corresponding to the pole section alignment contour and a second rotational alignment key (83) corresponding to the ring alignment contour, rotationally aligning the first rotational alignment key with the pole section alignment contour and the second rotational alignment key with the ring alignment contour, and pressing at least a portion of the first skewed center ring element into the inner perimeter of the first stator pole section such that the first rotational alignment key corresponds with the pole section alignment contour and the second rotational alignment key corresponds with the ring alignment contour, so as to provide a desired rotational alignment of the first pole section and the first skewed center ring element relative to each other.

The first pole section alignment contour may comprise an axial notch (38), the first rotational alignment key may comprise a tab (82) corresponding to the notch, the ring alignment contour may comprise an axial notch (80), and the second rotational alignment key may comprise a protrusion (83) corresponding to the notch of the ring alignment contour.

The second stator pole section (22) may be provided with a pole section alignment contour (87) and the step of pressing at least a portion of the second skewed center ring element into the inner perimeter of the second stator pole section may comprise the steps of providing an ring alignment fixture having a first rotational alignment key (82) corresponding to the pole section alignment contour and a second rotational alignment key (83) corresponding to the ring alignment contour, rotationally aligning the first rotational alignment key with the pole section alignment contour and the second rotational alignment key with the ring alignment contour, and pressing at least a portion of the second skewed center ring element into the inner perimeter of the second stator pole section such that the first rotational alignment key corresponds with the pole section alignment contour and the second rotational alignment key corresponds with the ring alignment contour so as to provide a desired rotational alignment of the second pole section and the second skewed center ring element relative to each other. The second pole section alignment contour may comprise an axial notch (38), the first rotational alignment key may comprise a tab (82) corresponding to the notch, the ring alignment contour may comprise an axial notch (80), and the second rotational alignment key may comprise a protrusion (83) corresponding to the notch of the ring alignment contour.

BRIEF DESCRIPTION OF THE DRAWINGS

FIG. 2 is a right perspective view of a first pole section shown in FIG. 1.

FIG. 3 is an exploded view of the pole section shown in FIG. 2.

FIG. 8 is a right plan view of the pole section shown in FIG. 6.

FIG. 9 is a vertical cross-sectional view of the pole section shown in FIG. 8, taken generally on line B-B of FIG. 8.

FIG. 10 is a side view of a first laminate geometry.

FIG. 11 is a side view of a second laminate geometry.

FIG. 12 is a side view of a third laminate geometry.

FIG. 13 is a side view of a forth laminate geometry.

FIG. 14 is a side view of a fifth laminate geometry.

FIG. 15 is a right side view of the center ring shown in FIG. 2.

FIG. 16 is a right side view of the center ring shown in FIG. 15.

FIG. 17 is an enlarged detailed view of the center ring shown in FIG. 12, taken within the indicated circle of FIG. 12.

DETAILED DESCRIPTION OF THE PREFERRED EMBODIMENTS

Figure 1:
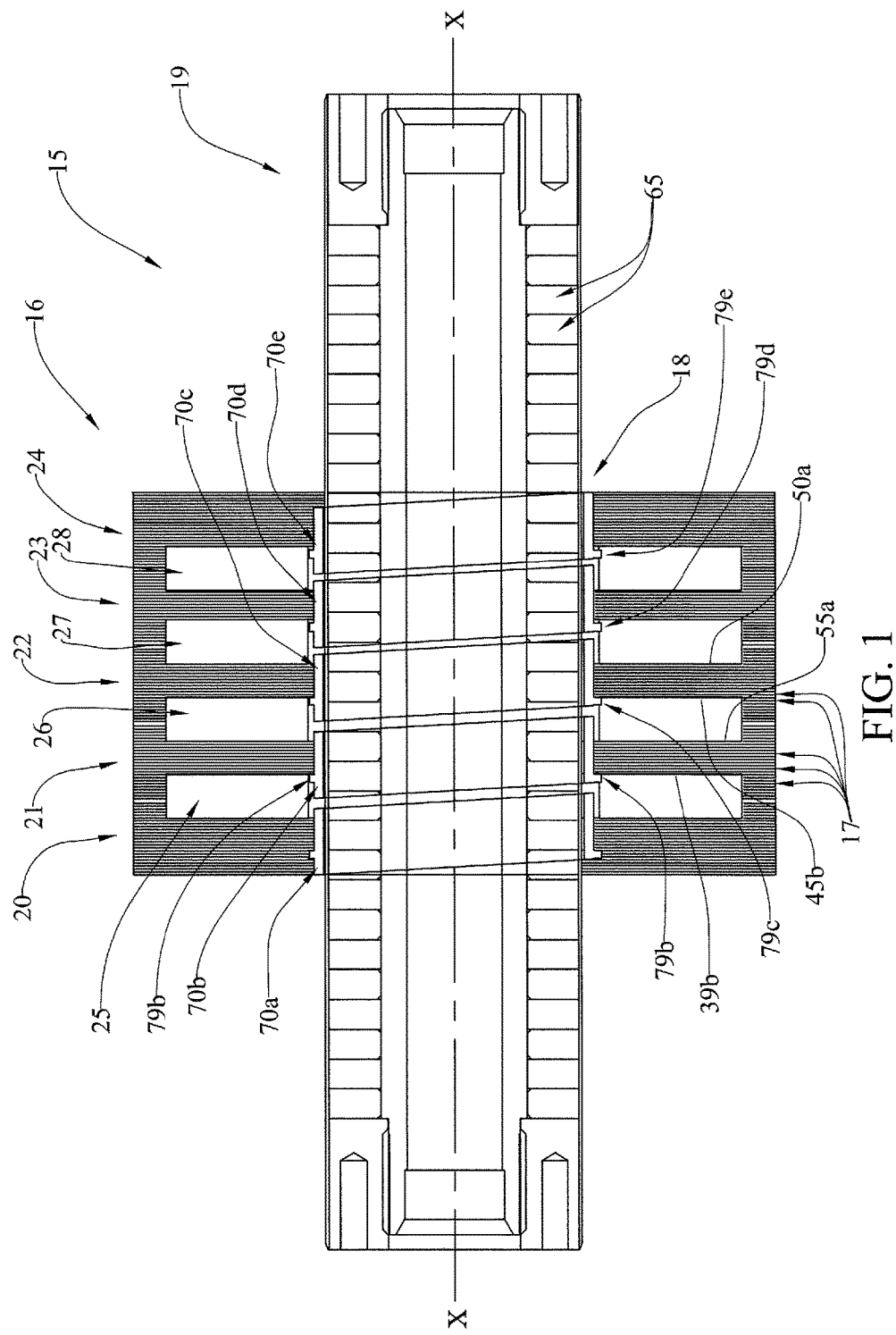
FIG. 1 is a longitudinal vertical cross-sectional view of the first embodiment of the linear motor assembly.
Figure 5:
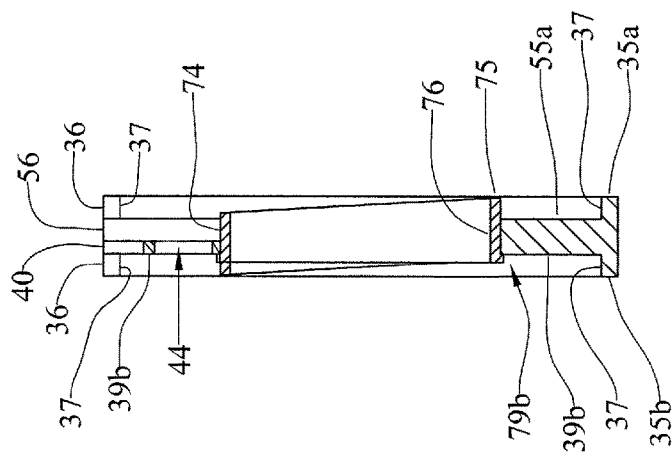
FIG. 5 is a vertical cross-sectional view of the pole section shown in FIG. 4, taken generally on line B-B of FIG. 4.
Figure 4:
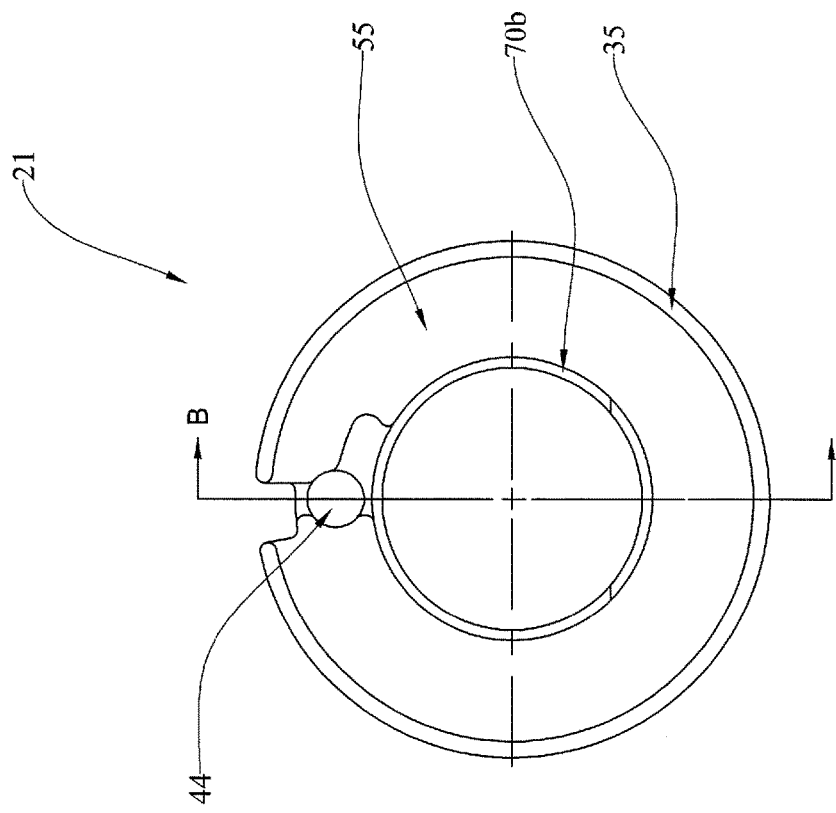
FIG. 4 is a right plan view of the pole section shown in FIG. 2.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

This invention provides an improved linear motor, an embodiment of which is generally indicated at 15. As shown in FIG. 1, linear motor 15 generally includes specifically configured stator 16 and mover 19. Mover 19 is a cylindrical member elongated about axis x-x and formed of a plurality of annular permanent magnets, severally indicated at 65, spaced axially along its outer circumference. Mover 19 is coincident with stator 16 and moves linearly along axis x-x relative to stator 16. Movement along axis x-x is referred to herein as movement in the axial direction.

As shown in FIGS. 1 and 2, stator 16 is a generally cylindrical member elongated about axis x-x and having inner opening 18 through which mover 19 moves. As shown in FIG. 1, stator 16 is primarily formed from four pole sections 20-24 that are stacked in the axial direction to form recesses 25-28 therebetween. Individual stator pole sections 20-24 are glued or bolted together, with coils therebetween, to form stator core 16. Stator 16 also includes end pieces, also formed of laminates, which are fixed by glue, bolts or other means to either end of the stacked pole sections 20-24 to form stator core 16. Recess 25-28 house conventional coils, which are energized as desired to magnetically interact with mover 19 to cause axial movement of mover 19 relative to stator 16. The interior of stator 16 is a cylindrical hollow 18 of constant diameter along the length thereof.

As shown in FIGS. 1-14, each individual pole section 20-24 is in turn formed from multiple laminates 17 that are stacked and glued together axially. Thus, the laminates are orientated in a plane that is generally perpendicular to axis x-x of mover 19. As shown in FIGS. 1-17, each of pole sections 20-24 also includes inner, specially configured cylindrical center ring 70a-70e, respectively, the inner cylindrical surfaces of which define opening 18 through which mover 19 reciprocates.

In this embodiment, laminates 17 are formed of a magnetic steel lamination material, such as M-15 type, that is either laser-cut or punched into the desired cross-sectional geometry. The thickness of each laminated layer 17 is generally the same. However, the cross-sectional geometry of each laminate 17 varies depending on its axial spaced location in the subject pole section. The cross-sectional geometry of laminates 17 are configured so as to form, when stacked and held together with a lamination adhesive, the shape of the respective stator pole section 20-24.

Pole section 21 is shown in more detail in FIGS. 2-5. As shown in FIG. 3, pole section 21 is formed by stacking multiple laminates 17a, having cross-sectional geometry 29 shown in FIG. 12, together with multiple laminates 17b, having cross-sectional geometry 30 shown in FIG. 11, together with multiple laminates 17c, having cross-sectional geometry 33 shown in FIG. 14, together with multiple laminates 17d, having cross-sectional geometry 29 shown in FIG. 12. In this embodiment, pole section 21 comprises about 25 individual laminates 17a having geometry 29, about 14 individual laminates 17b having cross-sectional geometry 30, about 25 individual laminates 17c having cross-sectional geometry 33, and about 25 individual laminates 17d again having cross-sectional geometry 29, moving left-to-right along axis x-x with reference to FIG. 3. When stacked and glued together, the outer portion of pole section 21 is formed. Thereafter, center ring 70b is pressed into the center opening of laminated section 21, as further described below.

Figure 7:
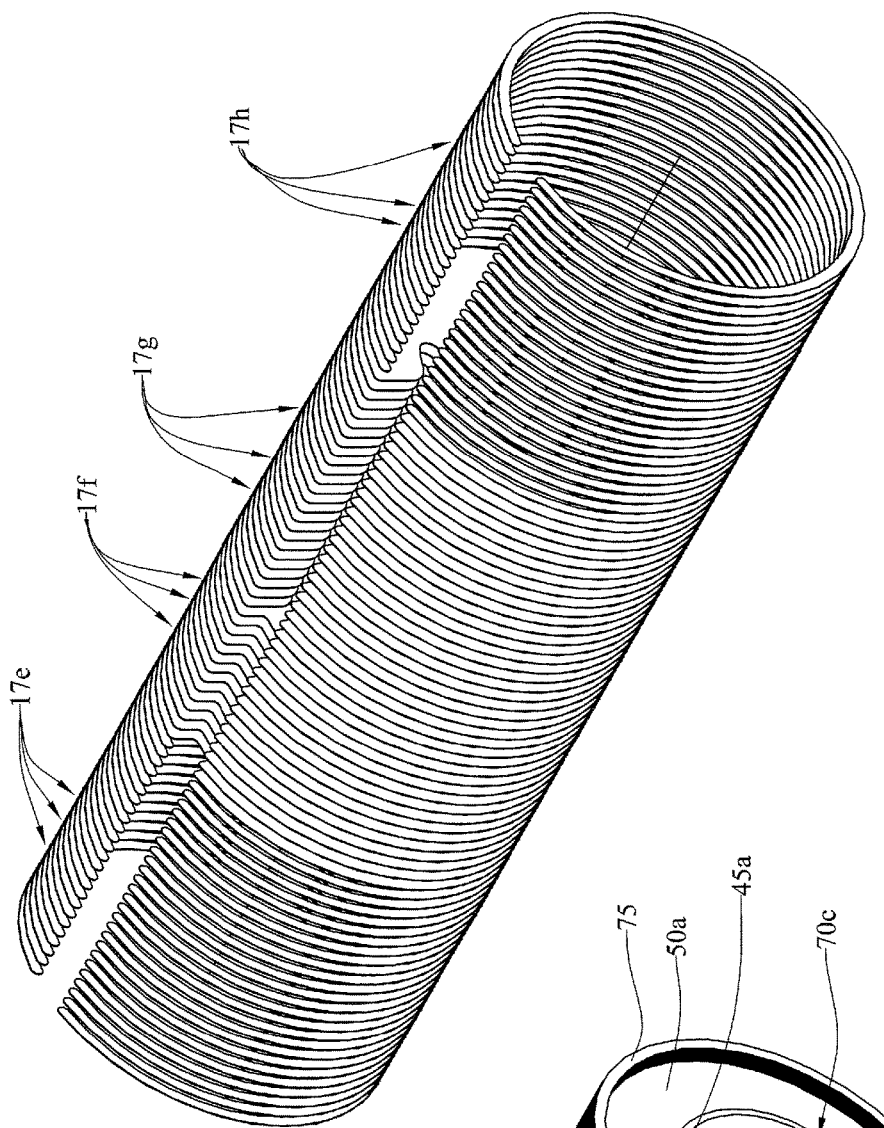
FIG. 7 is an exploded view of the pole section shown in FIG. 6.
Figure 6:
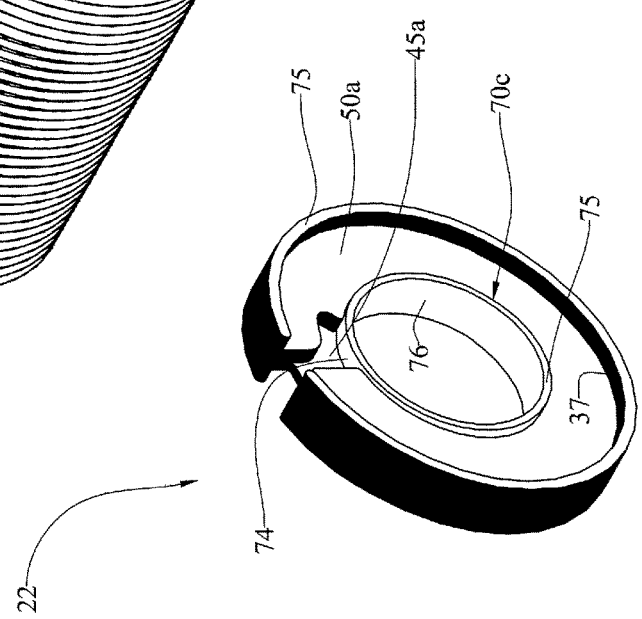
FIG. 6 is a right perspective view of a second pole section shown in FIG. 1.

Pole section 22 is shown in more detail in FIGS. 6-9. As shown in FIG. 7, pole section 22 is formed by stacking multiple laminates 17e, having cross-sectional geometry 29 shown in FIG. 12, together with multiple laminates 17f, having cross-sectional geometry 31 shown in FIG. 10, together with multiple laminates 17g, having cross-sectional geometry 32 shown in FIG. 13, together with multiple laminates 17h, having cross-sectional geometry 29 shown in FIG. 12. Thus, pole section 22 may be varied from pole section 21 by using alternatively-configured cross-sectional geometry laminates. Whereas the center portion of pole section 21 is formed of multiple laminates 17b and 17c having cross-sectional geometries 31 and 32, respectively, the center portion of pole section 22 is formed of laminates 17f and 17g having alternative cross-sectional geometries 31 and 32, respectively. In this embodiment, pole section 22 comprises about 25 individual laminates 17e having geometry 29, about 14 individual laminates 17f having cross-sectional geometry 31, about 25 individual laminates 17g having cross-sectional geometry 32, and about 25 individual laminates 17h having cross-sectional geometry 29, moving left-to-right along axis x-x with reference to FIG. 7. When stacked and laminated together, the outer portion of pole section 22 is formed. Thereafter, center ring 70c is pressed into the center opening of laminated section 22, as further described below.

It is contemplated that pole sections may be formed with multiple laminates having various alternative combinations of cross-sectional geometries. Thus, while a number of cross-sectional geometries for the laminates are shown and described, it is contemplated that other alternative geometries may be employed by one skilled in the art. Having laminations that are oriented in planes perpendicular to axis x-x has been unexpectedly found to reduce undesired stator heating and to avoid eddy currents.

Laminates 17a, 17d, 17e and 17h each have cross-sectional geometry 29. As shown in FIG. 12, geometry 29 comprises thin ring 35 having outer perimeter 36, inner perimeter 37, thickness 60 between outer perimeter 36 and inner perimeter 37, front face 35a and rear face 35b. Opening or radial gap 38 is provided between inner perimeter 37 and outer perimeter 36.

Cross-sectional geometry 30 of laminates 17b is shown in FIG. 11. As shown, geometry 30 comprises thickened ring 39, having outer perimeter 40 and inner perimeter 41. Thickness 42 between outer perimeter 40 and inner perimeter 41 is significantly larger than thickness 60 of cross-sectional geometry 29. Ring 39 includes front face 39a and opening 44 between face 39a and its rear face 39b. In addition, notch 43 is provided at the top extending in from outer perimeter 40. Opening 44 is provided so that when multiple laminates 17b of cross-sectional geometry 30 are stacked together, a cylindrical space is provided for housing a temperature sensor.

Cross-sectional geometry 33 of laminates 17c is shown in FIG. 14. Cross-sectional geometry 33 comprise ring 55 of the same thickness 58 as thickness 42 of cross-sectional geometry 30. Ring 55 is defined by outer perimeter 56, inner perimeter 57, front face 55a and a rear face. Cross-sectional geometry 33 includes a specially configured contoured opening 59 between outer perimeter 56 and inner perimeter 57. Opening 59 is a relief that provides clearance to allow the last turn of the windings in respective recesses 25-28 to exit.

Cross-sectional geometer 31, shown in FIG. 10, comprises ring 45 having front face 45a, rear face 45b, outer perimeter 46, inner perimeter 47 and thickness 48 between outer perimeter 46 and an inner perimeter 47, which is the same as thickness 42 of cross-sectional geometry 30 and thickness 48 of cross-sectional geometry 33. This lamination geometry is essentially the same as cross-sectional geometry 30, except that it only has notch 49 and does not include opening 44.

Cross-sectional geometry 32 is shown in FIG. 13, and is similar to cross-sectional geometry 33, shown in FIG. 14. It is formed of ring 50 having outer perimeter 51, inner perimeter 52, front face 50a and a corresponding rear face. It has thickness 53 between outer perimeter 51 and inner perimeter 52, which is the same as thicknesses 58, 48 and 42 of cross-sectional geometries 33, 31 and 30, respectively. However, the inner portion of relief 54 between inner perimeter 52 and outer perimeter 51 of cross-sectional geometry 32 varies slightly from the inner portion of relief 59 of cross-sectional geometry 33, as shown.

FIGS. 15-17 show inner rings 70a-70e. These inner rings are all specially machined unitary tubular members. As shown in FIG. 16, ring 70 is a cylindrical ring-shaped annular structure elongated along axis x-x and generally bounded by rightwardly and downwardly-facing annular angled off-vertical surface 71, rightwardly-facing annular vertical surface 77, outwardly-facing horizontal cylindrical surface 72, leftwardly-facing annular vertical surface 73, outwardly-facing cylindrical horizontal surface 74, leftwardly and upwardly-facing angled off-vertical annular surface 75, and inwardly-facing horizontal cylindrical surface 76. Surfaces 73, 72 and 77 define alignment protrusion 79. As described below, the small edge 79 machined into ring 70 creates a stop such that the pressing of ring 70 into the inner opening of the laminated pole section is repeatable with precision and such that axial alignment of the ring is correct. In particular, surface 73 of alignment protrusion 79 acts as a stop so that center ring 70 extends into the inner perimeter of the subject laminated pole section the desired amount.

As shown in FIG. 17, alignment protrusion 79 includes alignment notch 80 extending inwards from surface 72. Alignment notch 80 is used to rotationally align ring 70 with the laminated pole section into which it is inserted.

As shown in FIGS. 1, 5, 9 and 16, center ring 70 is machined as a solid steel ring that is pressed into the center of an assembled laminated pole section in order to create skew in stator 16 and reduce cogging forces in motor 15. As shown in FIG. 16, surfaces 71 and 75 are parallel annular surfaces and are angled off-vertical by skew angle 88. In this embodiment, skew angle 88 is about 3.2 degrees. Because of the positioning of center ring 70 within the subject laminated pole section, center ring 70 forms the inner tooth of the pole piece. It has been found that the skew of ring 70 and its placement helps to reduce torque ripple and provides unexpected and improved performance characteristics. As shown in FIG. 1, pole sections 20-24, together with the end sections are stackable at axial spaced locations along axis x-x. Also as shown, each of the laminated pole sections 20-24 includes skewed center rings 70a-70e, respectively, which are pressed into the inner opening of the laminated portion of the pole section until projections 79a-70e, respectively, abut against the leftwardly-facing surface of the subject stator pole section. Thus, ring 70b is pressed into the center opening of the laminated portion of pole section 21 until surface 73 of projection 79b abuts against and is stopped by leftwardly-facing surface 39b of pole section 21. Similarly, ring 70c is pressed into the center opening of the laminated portion of pole section 22 until annular surface 73 of projection 79c abuts against and is stopped by leftwardly-facing surface 45b of pole section 22.

Figure 18:
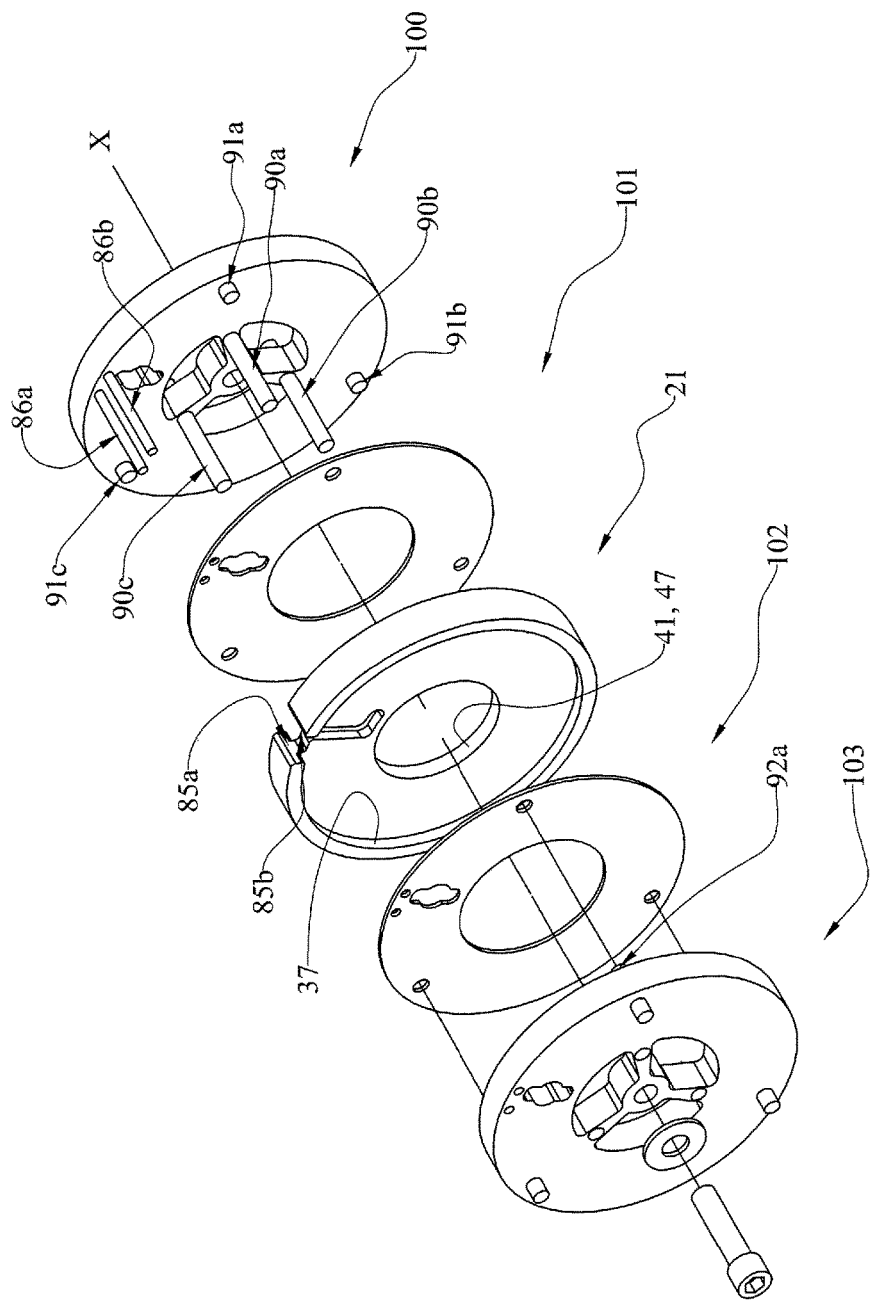
FIG. 18 is an exploded perspective view of the fixtures used to assemble the laminated pole section shown in FIG. 2.

FIG. 18 shows the use of fixtures 100 and 103 to properly align laminates 17a-17e about axis x-x relative to each other when forming pole section 21. As shown, fixture 100 is a generally cylindrical member having an outer perimeter and an inner perimeter. Two outer positioning rods 86a and 86b extend from the left face of fixture 100 parallel to axis x-x. In addition, three inner positional rods 90a-90c extend from the left face of fixture 100 parallel to axis x-x. Also, three shorter positional rods 91a-91c extend from the left face of fixture 100 parallel to axis x-x. Inner rods 90a-90c are positioned on fixture 100 such that an imaginary circle drawn about all three rods has a diameter that is substantially equal to the diameter of inner perimeter 41, 57 of geometry 30, 33 of laminates 17b and 17c, respectively. Rods 91a-91c are positioned on fixture 100 such that an imaginary circle drawn about all three rods has a diameter that is substantially equal to the diameter of inner perimeter 37 of geometry 29 of laminates 17a and 17d. Rods 86a and 86b are in turn positioned on fixture 100 separated from each other a distance approximately equal to the distance between edges 85a and 85b of notches 38, 43, 49, 54 and 59. As shown, fixture 103 is a generally cylindrical member having an outer perimeter and an inner perimeter. Three shorter positional rods 92a-92c extend from the right face of fixture 100 parallel to axis x-x. Inner rods 90a, 92b (not shown) and 92c (not shown) are positioned on fixture 100 to match the location of rods 91a-91c on fixture 100, such that an imaginary circle drawn about all three rods has a diameter that is substantially equal to the diameter of inner perimeter 37 of geometry 29 of laminates 17a and 17d. Thus, all of the required laminates may be slipped over the rods and stacked on fixtures 100 and 103 so that they are all properly rotationally aligned relative to each other.

In particular, spacer 101 is first aligned and positioned on fixture 100 with rods 86a-86b and 91a-91c extending through the respective corresponding openings in spacer 101 and rods 90a-c extending through the center opening of spacer 101. Next, laminates 17a having cross-sectional geometry 29 are positioned and slipped over the rods of fixture 100 such that rods 86a and 86b extend between the opposed sides of gap 38 of cross-sectional geometry 29 of laminates 17a, and rods 91a-91c fit within and support inner perimeter 37 of cross-sectional geometry 29 of laminates 17a. Next, laminates 17b having cross-section geometry 30 are positioned and slipped over the rods of fixture 100 such that arms 86a and 86b extend between the outer opposed sides of notch 43 of cross-sectional geometry 30 of laminates 17b, and rods 90a-90c fit within and support inner perimeter 41 of cross-sectional geometry 30 of laminates 70b. Next, laminates 17c having cross-sectional geometry 33 are positioned and slipped over the rods of fixture 100 such that arms 86a and 86b extend between the outer opposed sides of opening 59 of cross-sectional geometry 33 of laminates 17c, and arms 90a-90c fit within and support inner perimeter 57 of cross-sectional geometry 33 of laminates 17c. Next, laminates 17d having cross-sectional geometry 29 are positioned and slipped over the rods of fixture 100 such that rods 86a and 86b extend between the opposed sides of gap 38 of cross-sectional geometry 29 of laminates 17d. Next, spacer 102 is aligned and positioned on fixture 100 with rods 86a-86b extending through the respective corresponding openings in spacer 102 and rods 90a-90c extending through the center opening of spacer 102. End fixture 103 is then aligned and positioned in fixture 100 such that rods 86a and 86b of fixture 100 extend through the corresponding openings in end fixture 103 and such that rightward-extending rods 92a-92c of fixture 103 extending through the respective corresponding openings in spacer 102 and then in turn fit within and inner perimeter 37 of cross-sectional geometry 29 of laminates 17d. With laminate adhesive between laminate layers 17a-17d, fixture 100 and fixture 103 are then pressed against each other while the adhesive of the assembly cures. In this manner, the stator pole section laminations are assembled in a fixture which aligns each of the lamination pieces in the proper orientation while the adhesive cures so that a fully assembled laminated pole section is provided.

Pole section 22 is formed in a similar manner. In particular, spacer 101 is first aligned and positioned on fixture 100 with rods 86a-86b and 91a-91c extending through the respective corresponding openings in spacer 101 and rods 90a-90c extending through the center opening of spacer 101. Next, laminates 17e having cross-sectional geometry 29 are positioned and slipped over the rods of fixture 100 such that rods 86a and 86b extend between the opposed sides of gap 38 of cross-sectional geometry 29 of laminates 17e, and rods 91a-91c fit within and support inner perimeter 37 of cross-sectional geometry 29 of laminates 17e. Next, laminates 17f having cross-section geometry 31 are positioned and slipped over the rods of fixture 100 such that arms 86a and 86b extend between the outer opposed sides of notch 49 of cross-sectional geometry 31 of laminates 17f, and rods 90a-90c fit within and support inner perimeter 47 of cross-sectional geometry 31 of laminates 70f. Next, laminates 17g having cross-sectional geometry 32 are positioned and slipped over the rods of fixture 100 such that arms 86a and 86b extend between the outer opposed sides of opening 54 of cross-sectional geometry 32 of laminates 17g, and arms 90a-90c fit within and support inner perimeter 52 of cross-sectional geometry 32 of laminates 17g. Next, laminates 17h having cross-sectional geometry 29 are positioned and slipped over the rods of fixture 100 such that rods 86a and 86b extend between the opposed sides of gap 38 of cross-sectional geometry 29 of laminates 17h. Next, spacer 102 is aligned and positioned on fixture 100 with rods 86a-86b extending through the respective corresponding openings in spacer 102 and rods 90a-c extending through the center opening of spacer 102. End fixture 103 is then aligned and positioned in fixture 100 such that rods 86a and 86b of fixture 100 extend through the corresponding openings in end fixture 103 and such that rightward-extending rods 92a-92c of fixture 103 extending through the respective corresponding openings in spacer 102 and then in turn fit within and inner perimeter 37 of cross-sectional geometry 29 of laminates 17h. With laminate adhesive between laminate layers 17e-17h, fixture 100 and fixture 103 are then pressed against each other while the adhesive of the assembly cures.

Figure 19:
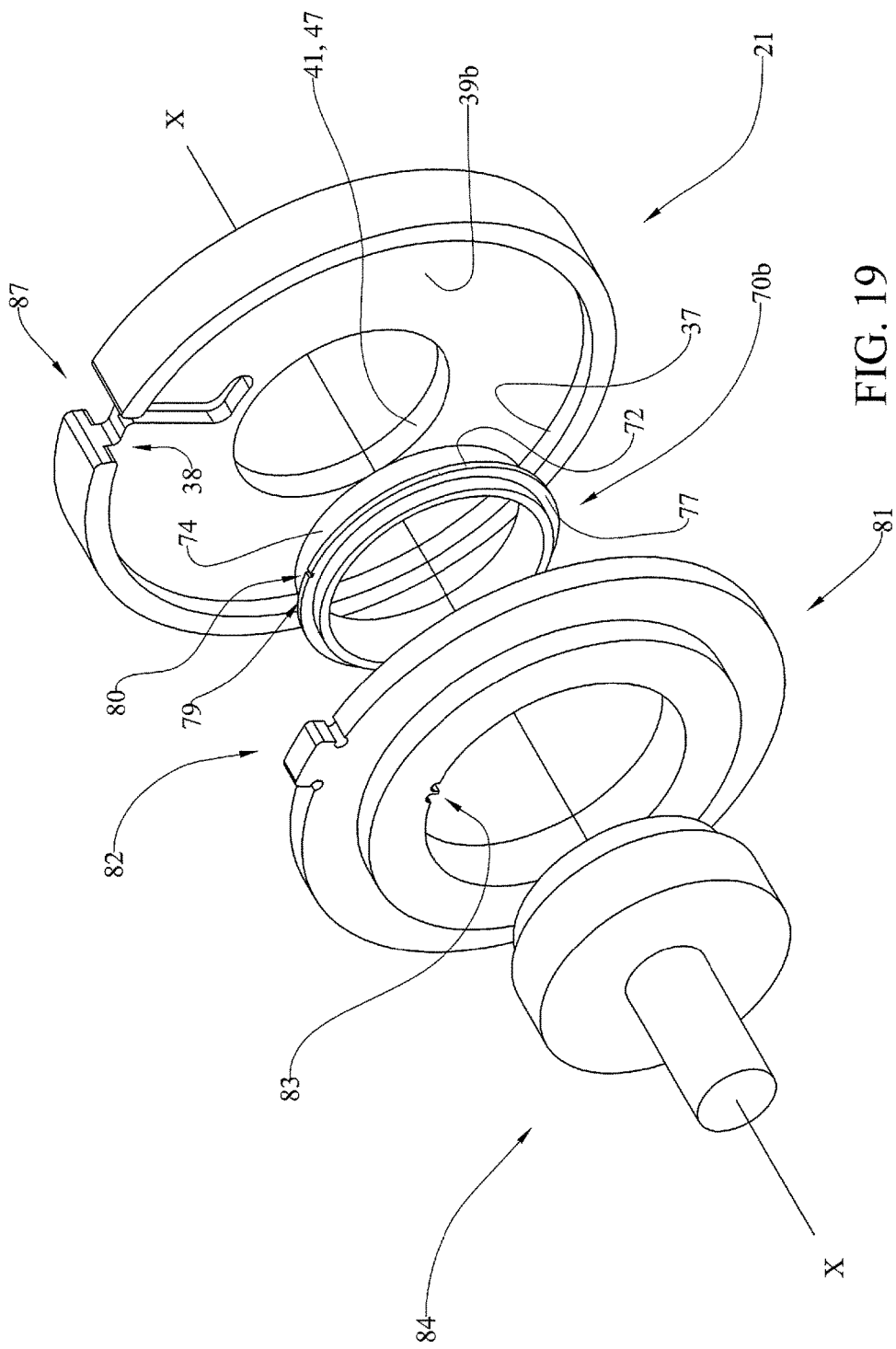
FIG. 19 is an exploded perspective view of the fixture used to assemble a center ring and laminated pole section shown in FIG. 1.

FIG. 19 is a representative view showing the use of fixture 81 and press 84 to combine ring 70 with the laminated portion of each pole section formed as described above. In particular, fixture 81 is provided to properly align ring 70 in the center opening of the laminated portion of pole section 20-24. As shown, fixture 81 is a specially configured cylindrical member having an outer perimeter and an inner perimeter defining a center opening. Alignment key 82 extends from the outer perimeter of fixture 81. The outer perimeter of fixture 81 has a diameter that is substantially equal to the diameter of inner perimeter 37 of geometry 29 of laminates 17a. Alignment key 82 extends beyond that perimeter and has a width that is to the width of gap 38 of cross-sectional geometry 29 of laminates 17a. Thus, if aligned properly about axis x-x, fixture 81 should fit within the recess of pole section 21 formed by laminates 17a such that its outer perimeter is encompassed within inner perimeter 37 of geometry 29 of laminates 17a and alignment key projection 82 fits through opening 38 of geometry 29 of laminates 17a.

The inner perimeter of fixture 81 has a diameter that is substantially equal to the diameter of surface 72 of projection 79b of ring 70b. Thus, ring 70b slides within the inner perimeter of fixture 81 if and when ring 70b is properly rotationally aligned such that inner projection 83 slides axially into notch 80 in projection 79b of ring 70b. Thus, to properly align ring 70b in the laminated portion of pole section 21, ring 70b is rotationally aligned with fixture 81 such that projection 83 axially slides into notch 80 and the outer perimeter of alignment projection 79b is within the inner perimeter of fixture 81.

So first ring 70b is rotationally aligned with fixture 81 such that projection 83 axially slides into notch 80 and the outer perimeter of alignment projection 79b is within the inner perimeter of fixture 81. Once ring 70b is rotationally aligned within the inner perimeter of fixture 81, fixture 81 is aligned with the laminated portion of pole section 21 such that outer alignment key 82 slides within the gap formed by opening 38 of geometry 29 in laminates 17a. This assures that fixture 81 is rotationally aligned properly with the laminated portion of pole section 21. Press 89 is then used to force ring 70 into the center opening of the laminated portion of pole section 21. Ring 70 is pressed into the center opening of the laminated portion of pole section 21 until annular surface 73 of alignment projection 79*b* abuts and is stopped by leftward-facing surface 39*b* of pole section 21. In this manner, ring 70 is rotationally aligned about axis x-x relative to pole section 21 and is axially aligned along axis x-x relative to laminate pole section 21. This method of both rotationally and axially aligning ring 70*b* into the center opening of laminated pole section 21 provides for repeatability, precision and accurate ring positioning so that a proper skew is provided. The same process is employed with respect to the other pole sections.

Once each of the pole sections, with its respective center ring, are formed, they are in turn stacked axially in the desired configuration to form stator core 16 with windings as required in recesses 25, 26, 27 and 28. In addition, temperature gages and the like may be positioned in the specially configured openings, for example opening 44, when the pole sections are stacked together. In this manner, any combination or configuration of laminates, laminated pole sections or pole core may be formed as desired.

The present invention contemplates that many changes and modifications may be made. For example, the assembled stator core may be fitted inside a magnetic tube which adds an additional magnetic flux path, thereby improving the force generated by the motor. Such pipe may be ordinary or magnetic stainless steel for improved corrosion resistance. The magnetic lamination material of laminates 17 may be of various grades or have various magnetic properties, depending on the performance versus cost desired. The diameter size of the stator components are scalable, depending on the performance desired from the final motor. The length of the assembled stator, the axial thickness of the pole sections, and the number of pole sections are scalable, again depending on the performance desired and the practical manufacturing limits of the components. The cross-sectional geometries of the individual laminates may be varied as desired. The number and geometries of the pole sections may be varied as desired. Therefore, while the presently preferred form of the linear motor has been shown and described, those persons skilled in this art will readily appreciate the various additional changes and modification may be made without departing from the spirit of the invention, as defined and differentiated by the following claims.

The invention claimed is:

1. A linear motor comprising:
a stator having an opening;
a mover disposed in said opening and configured and arranged to reciprocate linearly in an axial direction relative to said stator;
said stator comprising a first pole section and a second pole section stacked in said axial direction and forming a recess between them for receiving annular windings;
said first pole section comprising a first laminate having a first cross-sectional geometry;
said first pole section comprising a second laminate having a second cross-sectional geometry different from said first cross-sectional geometry;
said first laminate and said second laminate stacked in said axial direction;
said first pole section comprising a third laminate having a third cross-sectional geometry different from said first cross-sectional geometry and said second cross-sectional geometry; and
said third laminate stacked in said axial direction with said first laminate and said second laminate.

2. The linear motor set forth in claim 1, wherein said first pole section further comprises a fourth laminate having said first cross-sectional geometry and stacked in said axial direction with said first, second and third laminates.

3. The linear motor set forth in claim 1, wherein said first pole section comprises multiple laminates having said first cross-sectional geometry and multiple laminates having said second cross-sectional geometry and stacked in said axial direction.

4. The linear motor set forth in claim 1, wherein said first cross-sectional geometry of said first laminate comprises an annular ring having an outer perimeter and an inner perimeter.

5. A linear motor comprising:
a stator having an opening;
a mover disposed in said opening and configured and arranged to reciprocate linearly in an axial direction relative to said stator;
said stator comprising a first pole section and a second pole section stacked in said axial direction and forming a recess between them for receiving annular windings;
said first pole section comprising a first laminate having a first cross-sectional geometry and a second laminate having a second cross-sectional geometry different from said first cross-sectional geometry;
said first laminate and said second laminate stacked in said axial direction;
said first cross-sectional geometry of said first laminate comprising an annular ring having an outer perimeter and an inner perimeter; and
said annular ring comprising an opening between said outer perimeter and said inner perimeter.

6. A linear motor comprising:
a stator having an opening;
a mover disposed in said opening and configured and arranged to reciprocate linearly in an axial direction relative to said stator;
said stator comprising a first pole section and a second pole section stacked in said axial direction and forming a recess between them for receiving annular windings;
said first pole section comprising a first laminate having a first cross-sectional geometry and a second laminate having a second cross-sectional geometry different from said first cross-sectional geometry;
said first laminate and said second laminate stacked in said axial direction;
said first cross-sectional geometry of said first laminate comprising an annular ring having an outer perimeter and an inner perimeter; and
said second cross-sectional geometry of said second laminate comprising an annular ring having an outer perimeter and an inner perimeter and a radial thickness between them greater than a radial thickness of said annular ring of said first cross-section geometry.

7. The linear motor set forth in claim 6, wherein said annular ring of said second cross-sectional geometry of said second laminate comprises a shaped opening between said outer perimeter and said inner perimeter.

8. The linear motor set forth in claim 6, wherein said annular ring of said second cross-sectional geometry of said second laminate comprises a first face and a second face and an opening between said first face and said second face.

9. The linear motor set forth in claim 8, wherein said annular ring of said second cross-sectional geometry of said second laminate comprises a notch extending towards said inner perimeter from said outer perimeter.

10. A linear motor comprising:
a stator having an opening;
a mover disposed in said opening and configured and arranged to reciprocate linearly in an axial direction relative to said stator;
said stator comprising a first pole section and a second pole section stacked in said axial direction and forming a recess between them for receiving annular windings;
said first pole section comprising a first laminate having a first cross-sectional geometry and a second laminate having a second cross-sectional geometry different from said first cross-sectional geometry;
said first laminate and said second laminate stacked in said axial direction; and
a center ring element within said first pole section and defining said opening of said stator.

11. The linear motor set forth in claim 10, wherein said center ring element comprises:
an inner perimeter configured to define at least in part said stator opening and an outer perimeter configured to fit at least in part within said inner perimeter of said first pole section;
a first facing surface and a second facing surface; and
said first facing surface skewed relative to an imaginary plane orientated generally perpendicular to said axial direction of said mover such that said first facing surface is not parallel to said plane orientated generally perpendicular to said axial direction of said mover.

12. The linear motor set forth in claim 11, wherein said second facing surface is skewed relative to said plane perpendicular to said axial direction and is parallel to said first facing surface.

13. The linear motor set forth in claim 11, wherein said first pole section comprises a first facing surface orientated in a plane generally perpendicular to said axial direction of said mover and said outer perimeter of said center ring element comprises an axial alignment projection configured and arranged to extend radially outward at least in part beyond said inner perimeter of said first pole section and to abut against said first facing surface of said first pole section.

14. The linear motor set forth in claim 13, wherein said axial alignment projection comprises an annular contact surface orientated in a plane generally perpendicular to said axial direction of said mover.

15. The linear motor set forth in claim 11, wherein said center ring element comprises a solid unitary steel tube.

16. A linear motor comprising:
a stator having an opening;
a mover disposed in said opening and configured and arranged to reciprocate linearly in an axial direction relative to said stator;
said stator comprising a first pole section and a second pole section stacked in said axial direction and forming a recess between them for receiving annular windings;
said first pole section comprising a first laminate having a first cross-sectional geometry and a second laminate having a second cross-sectional geometry different from said first cross-sectional geometry; and
said first laminate and said second laminate of said first pole section stacked in said axial direction;
said second pole section comprising a first laminate having a first cross-sectional geometry and a second laminate having a second cross-sectional geometry different from said first cross-sectional geometry; and
said first laminate and said second laminate of said second pole section stacked in said axial direction.

17. The linear motor set forth in claim 16, wherein said second pole section further comprises a third laminate having a third cross-sectional geometry different from said first cross-sectional geometry and said second cross-sectional geometry and stacked in said axial direction with said first laminate and said second laminate.

18. The linear motor set forth in claim 17, wherein said second pole section further comprises a fourth laminate having said first cross-sectional geometry and stacked in said axial direction with said first, second and third laminates.

19. The linear motor set forth in claim 16, wherein said second pole section comprises multiple laminates having said first cross-sectional geometry and multiple laminates having said second cross-sectional geometry and stacked in said axial direction.

20. The linear motor set forth in claim 19, and further comprising a center ring element within said second pole section and defining said opening of said stator.

21. The linear motor set forth in claim 20, wherein said center ring element comprises:
an inner perimeter configured to define at least in part said stator opening and an outer perimeter configured to fit at least in part within said inner perimeter of said second pole section;
a first facing surface and a second facing surface; and
said first facing surface skewed relative to an imaginary plane orientated generally perpendicular to said axial direction of said mover such that said first facing surface is not parallel to said plane perpendicular to said axial direction of said mover.

22. The linear motor set forth in claim 21, wherein said second facing surface is skewed relative to said plane perpendicular to said axial direction and is parallel to said first facing surface.

23. The linear motor set forth in claim 21, wherein said second pole section comprises a first facing surface orientated in a plane generally perpendicular to said axial direction of said mover and said outer perimeter of said center ring element comprises an axial alignment projection configured and arranged to extend radially outward at least in part beyond said inner perimeter of said second pole section and to abut against said first facing surface of said second pole section.

24. The linear motor set forth in claim 23, wherein said axial alignment projection comprises an annular contact surface orientated in a plane generally perpendicular to said axial direction of said mover.

25. A linear motor comprising:
a stator having an opening;
a mover disposed in said opening and configured and arranged to reciprocate linearly in an axial direction relative to said stator;
said stator comprising a first pole section and a second pole section stacked in said axial direction and forming a recess between them for receiving annular windings;
said first pole section comprising a first laminate having a first cross-sectional geometry and a second laminate having a second cross-sectional geometry different from said first cross-sectional geometry;
said first laminate and said second laminate stacked in said axial direction;
said first pole section comprising a first center ring element and said second pole section comprising a second center ring element;
each of said first center ring element and said second center ring element comprising an inner perimeter configured to define at least in part said stator opening and an outer perimeter configured to fit at least in part within said inner perimeter of said respective pole section, a first facing surface and a second facing surface, and said first and second facing surfaces skewed relative to an imaginary plane orientated generally perpendicular to said axial direction of said mover such that said first and second facing surfaces are not parallel to said plane orientated generally perpendicular to said axial direction of said mover;

wherein said skew of said second facing surface of said first center ring element of said first pole section is substantially equal to said skew of said first facing surface of said second center ring element of said second pole section; and wherein said first center ring element and said second center ring element are stacked in said axial direction to form at least in part said opening of said stator.

26. The linear motor set forth in claim 25, wherein said skew is configured and arranged to reduce cogging forces in said motor.

27. A linear motor comprising:
a stator having an opening;
a mover disposed in said opening and configured and arranged to reciprocate linearly in an axial direction relative to said stator;
said stator comprising a first pole section and a second pole section stacked is said axial direction and forming a recess between them for receiving annular windings;
said first pole section having an outer perimeter and an inner perimeter;
a center ring element having an inner perimeter configured to define at least in part said stator opening and an outer perimeter configured to fit at least in part within said inner perimeter of said first pole section;
said center ring element further comprising a first facing surface and a second facing surface; and
said first facing surface skewed relative to an imaginary plane orientated generally perpendicular to said axial direction of said mover such that said first facing surface is not parallel to said plane orientated generally perpendicular to said axial direction of said mover.

28. The linear motor set forth in claim 27, wherein said second facing surface is skewed relative to said plane perpendicular to said axial direction and is parallel to said first facing surface.

29. The linear motor set forth in claim 27, wherein said first pole section comprises a first facing surface orientated in a plane generally perpendicular to said axial direction of said mover and said outer perimeter of said center ring element comprises an axial alignment projection configured and arranged to extend at least in part beyond said inner perimeter of said first pole section and to abut against said first facing surface of said first pole section.

30. The linear motor set forth in claim 29, wherein said axial alignment projection comprises an annular contact surface orientated in a plane generally perpendicular to said axial direction of said mover.

31. The linear motor set forth in claim 27, wherein said center ring element comprises a solid unitary steel tube.

32. The linear motor set forth in claim 27, wherein said first pole section and said second pole section are provided with a rotational alignment contour.

33. The linear motor set forth in claim 32, wherein said rotational alignment contour comprises an axial notch.

34. The linear motor set forth in claim 27, wherein:
said first stator pole section comprises a pole section rotational alignment contour corresponding to a first rotational alignment key of a ring rotational alignment fixture; and
said center ring element comprises a ring rotational alignment contour corresponding to a second rotational alignment key of said ring rotational alignment fixture.

35. The linear motor set forth in claim 34, wherein said pole section rotational alignment contour comprises an axial notch, said first rotational alignment key comprises a tab corresponding to said notch, said ring rotational alignment contour comprises an axial notch, and said second rotational alignment key comprises a protrusion corresponding to said notch of said ring rotational alignment contour.

* * * * *